United States Patent [19]
Akamine et al.

[11] Patent Number: 5,214,741
[45] Date of Patent: May 25, 1993

[54] VARIABLE BIT RATE CODING SYSTEM

[75] Inventors: Masami Akamine, Yokosuka; Hidetaka Yoshikawa, Tokyo, both of Japan

[73] Assignee: Kabushiki Kaisha Toshiba, Kawasaki, Japan

[21] Appl. No.: 625,061

[22] Filed: Dec. 10, 1990

[30] Foreign Application Priority Data

Dec. 11, 1989 [JP] Japan ................................. 1-318762

[51] Int. Cl.[5] .............................................. G10L 3/02
[52] U.S. Cl. .......................................... 395/2; 381/47; 381/30; 381/37
[58] Field of Search .............................. 381/29–50; 395/2

[56] References Cited

U.S. PATENT DOCUMENTS

| | | | |
|---|---|---|---|
| 3,471,648 | 10/1969 | Miller | 381/37 |
| 4,386,237 | 5/1983 | Virupaksha et al. | 381/31 |
| 4,455,649 | 6/1984 | Estaban et al. | 381/31 |
| 4,860,355 | 8/1989 | Copperi | 381/36 |
| 4,903,301 | 2/1990 | Kondo et al. | 381/31 |
| 4,914,701 | 4/1990 | Zibman | 381/36 |
| 4,941,152 | 7/1990 | Medan | 381/31 |
| 4,972,484 | 11/1990 | Theile et al. | 381/37 |
| 5,020,058 | 5/1991 | Holden et al. | 381/29 |

FOREIGN PATENT DOCUMENTS

| | | |
|---|---|---|
| 0084125 | 1/1982 | European Pat. Off. |
| 0139803 | 5/1985 | European Pat. Off. |
| 0234859 | 2/1986 | European Pat. Off. |

OTHER PUBLICATIONS

Cheung et al., "High Quality 16 kb/s Voice Transmission: The Subband Coder Approach", IEEE ICASP80 on ASSP, Apr. 1980, pp. 319–322.
CCITT SG XVIII; "Annex to Question X/XV (Speech Packetization)"; Jun. 6–17 1988, Geneva.
"Digital Coding of Waveforms", Principles and Application to Speech and Video, pp. 486–504 by N. S. Jayant et al.

*Primary Examiner*—David D. Knepper
*Attorney, Agent, or Firm*—Oblon, Spivak, McClelland, Maier & Neustadt

[57] ABSTRACT

A packet communication system or ATM communication system in which a sequence of signals such as speech signals is divided into a plurality of band areas and the power of each band area is determined. Based on the power of each band area, coding signals are allocated for each band, frame by frame. At a receiving side, the signal to noise ratio SNR of the decoded signal is predicted by changing the total number of encoding bits for each band area based on the power of each band area signal. The bit rate is controlled so as to make the SNR constant. The bit rate is changed in accordance with a Fourier transform of the input signal.

4 Claims, 11 Drawing Sheets

FIG. 12A  QMF OUTPUT SIGNAL WAVE (INSERT "0" INTO QMF)

FIG. 12B  ESTIMATED DIFFERENTIAL SIGNAL $e_p(n)$ WAVE

FIG. 12C  GENERATED EXCITING SIGNAL WAVE

FIG. 12D  SYNTHESIS FILTER OUTPUT SIGNAL WAVE

FIG. 12E  SMOOTHING CIRCUIT OUTPUT WAVE

SMOOTHING RANGE

VARIABLE BIT RATE CODING SYSTEM

BACKGROUND OF THE INVENTION

1. Field of the Invention

The present invention relates to a variable bit rate coding system for use in a packet communication system or ATM communication system.

2. Description of the Related Art

A packet communication system has been realized which packetizes speech signals after coding and performs communication packet by packet. The packet communication system can treat signals of various media, such as a speech, image and data, in the same manner. In addition, the system has an advantage that it can transmit signals only of a sound-present range utilizing the burstness of a speech signal, thus ensuring efficient use of the transmission line. Accordingly, attention has been paid to the packet communication and ATM communication as a way to carry out ISDN and BISDN, and researches and development on these technologies have been actively conducted.

In the packet communication, when the congestion occurs in a network or packet delay is large, packets would be abandoned, degrading the speech quality. In particular, when the ADPCM using the adaptive prediction is used as a coding system, the degradation becomes large at the time of packet loss. An Embeded DPCM has been proposed as a coding system with less degradation at the time of packet loss in "Embeded DPCM for Variable Bit Rate Transmission," IEEE Trans. COM-28, 7, pp. 1040-1046 (July 1980) (hereinafter called Document 1).

In CCITT SGXV III, "Annex to Question X/XV (Speech Packetization) Algorithm and Protocol for Speech Packetization" (TD131, Geneva 6-17 Jun. 1988) (hereinafter called Document 2), the CCITT provisionally recommended the Embeded ADPCM as the G727 and the speech packet protocol as G764 as "coding system for speech packet communication."

Figure 14:
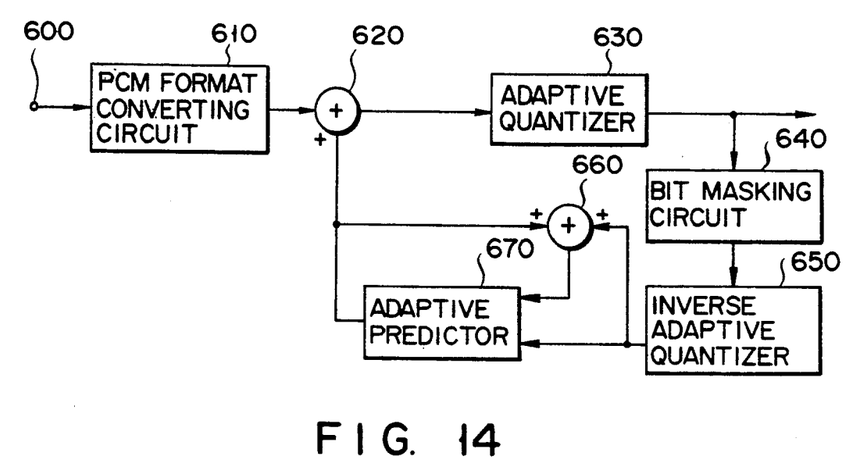
FIG. 14 is a block diagram of an encoder section of a conventional Embeded ADPCM.
Figure 15:
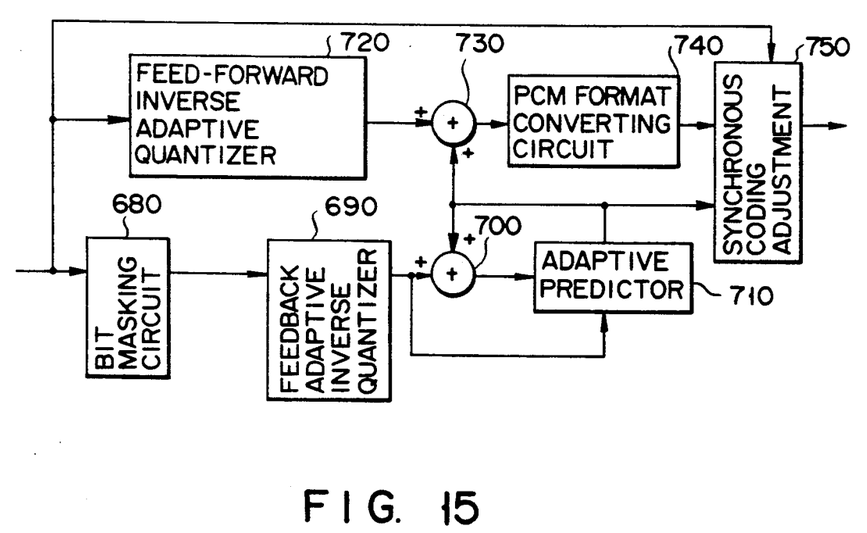
FIG. 15 is a block diagram of a decoder section of the convention Embedded ADPCM.

FIGS. 14 and 15 are block diagrams illustrating the structures of an encoder section and a decoder section of the provisionally-recommended G727 system. In the encoder shown in FIG. 14, the input is a speech signal digitized by a μ-PCM or A-PCm Codec. A PCm format converting circuit 610 converts a μ-PCM or A-PCM code into a linear PCM code. Reference numeral "630" denotes an adaptive quantizer and "670" denotes an adaptive predictor. A subtracter 620 calculates the difference between the input signal and a prediction signal, the output of the adaptive predictor 670, and sends the difference to the adaptive quantizer 630. The quantizer 630 quantizes the received prediction difference signal and outputs the result as an ADPCM code. A bit masking circuit 640 masks the lower bits of the ADPCM output code by the maximum number of abandonable bits, then shifts the code to the right. The output of the bit masking circuit 640 is sent as a core bit to an adaptive inverse quantizer 650, which in turn performs the inverse quantization of the core bit. The output of the adaptive inverse quantizer 650 is sent to the adaptive predictor 670 and adder 660. The adder 660 adds the output signal of the adaptive inverse quantizer 650 and the output signal of the adaptive predictor 670, thus yielding a locally decoded signal. The adaptive predictor 670, which is an adaptive filter having two-bit poles and six-bit zero points, prepares the prediction signal from the locally-decoded signal and inversely-quantized prediction difference signal received.

The number of bits of the adaptive quantizer 630 and the number of core bits to be fed back depend on the algorithm to be used. For instance, the 32-Kbps (4, 2) algorithm means that the quantization involves four bits and the core bits are two bits.

Referring to FIG. 14, the adaptive quantizer 630 forms a feed-forward path, while the bit masking circuit 640, adaptive inverse quantizer 650 and adaptive predictor 670 form a feedback path.

The operation of the decoder in FIG. 15 will be described below. This decoder, like the encoder, comprises a feedback path formed by a bit masking circuit 680, a feedback adaptive inverse quantizer 690 and an adaptive predictor 710, and a feed-forward path formed by a feed-forward adaptive inverse quantizer 720 and a PCM format converting circuit 740. The feedback path in the decoder has the same structure as the one in the encoder. The bit masking circuit 680 masks the lower bits of the received ADPCM code, excluding the upper, core bits, then shifts the code to the right, so that only the core bits are sent to the feedback adaptive inverse quantizer 690. This adaptive inverse quantizer 690 performs the inverse quantization of the core bits. The adaptive predictor 710 receives the inversely-quantized prediction difference signal or the output of the adaptive quantizer 690 and the locally-decoded signal or the output of an adder 70. The bit abandonment in the network is executed from the lower bits of the ADPCM code, thus ensuring transmission of the core bits. Accordingly, the bit masking circuit 680 on the decoder side provides the same output as the bit masking circuit 640 on the encoder side. In other words, the adaptive inverse quantizers 690 and 650 on the decoder and encoder sides, respectively, have exactly the same output and likewise the adaptive predictors 710 and 670 have exactly the sam output.

The feed-forward adaptive inverse quantizer 72 performs the inverse quantization of the core bits of the ADPCM output code and those bits remaining without abandonment. An adder 730 adds the output of the feed-forward adaptive inverse quantizer 720 and the output of the adaptive predictor 710, yielding a decoded signal. The decoded signal is then sent to the PCM format converting circuit 740, which in turn converts the linear PCM code into a μ-PCM or A-PCM code. A synchronous coding adjusting circuit 750 is provided to prevent an error from occurring from the synchronous tandem connection.

When abandonment of bits of the output code in the normal ADPCM, not Embedded type, the inversely-quantized prediction difference signal differs between the encoder and the decoder. As a result, the adaptive processing of the quantizer and predictor in the encoder is asynchronous with that in the decoder, and the error originating from the bit abandonment is refiltered by a synthesis filter, thus increasing the bit-abandonment-oriented degradation.

In the aforementioned Embeded ADPCM, since only the core bits are fed back to the predictor, no asynchronous operation would occur between the encoder and decoder even if those lower bits excluding the core bits are abandoned in the network. Further, since the prediction signal on the encoder side is the same as the one on the decoder side, the quantization noise corresponding to the number of abandoned bits is simply added directly to the encoded signal, suppressing the degradation of the speech quality originating from the bit abandonment.

Document 2 depicts how to form a speech packet making the best use of the above-described characteristic, and the protocol.

Figure 16:
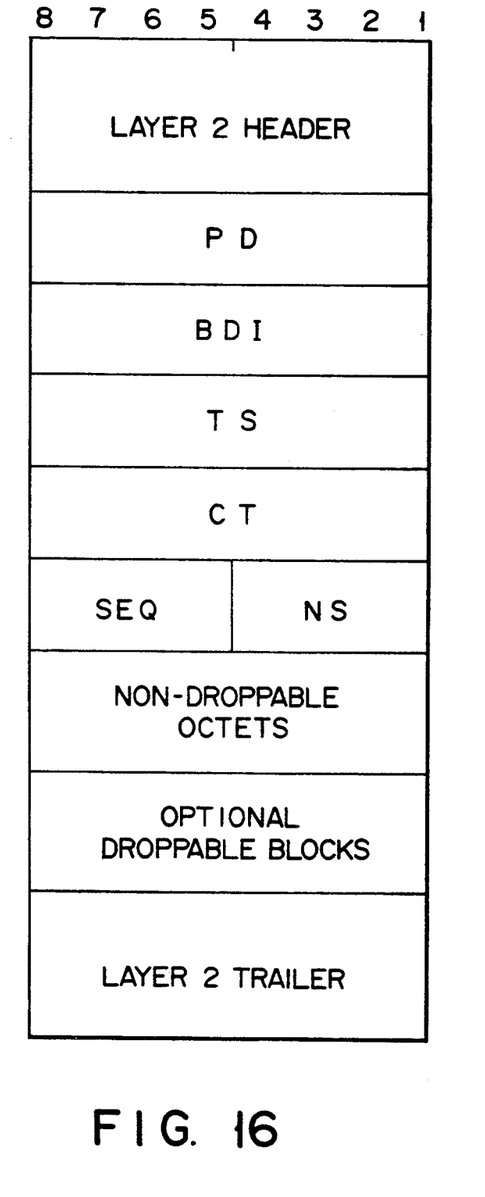
FIG. 16 is a diagram illustrating a conventional packet format.

FIG. 16 illustrates a packet format disclosed in document 2. Referring to this figure, bit 1 is LSB, and bit 8 is MSB. "PD" (Protocol Discriminator) serves to distinguish a speech packet from other packets. "BDI" (Block Dropping Indicator) indicates the number of blocks which can be abandoned in packetized, initial status and the number of blocks which can be abandoned on each node of the network. The "block" here is 128-bit information acquired by collecting one frame of coded speech outputs bit by bit with the frame for the coding being 16 ms (128 samples). "TS" (Time Stamp) indicates accumulation of delays caused at each node in the network. "CT" (Coding Type) is a field associated with a speech coding method used in preparing packets.

"SEQ" (Sequence Number) is a number representing the sequence of packets and is used when a packet loss occurs. "NS" (Noise) is a field indicating the level of the background noise. NON-DROPPABLE OCTETS, a block for core bits of the Embeded ADPCM output, is a field for information that cannot be abandoned in the network. OPTIONAL DROPPABLE BLOCKS, a block of the lower bits of the Embeded ADPCM, is an information field that can be abandoned when requested by a system on the network. A layer 2 header and a layer 2 trailer are respectively affixed to the beginning and end of each packet.

According to the protocol of the packet network using a packet having the format shown in FIG. 16, the packet abandonment is performed by abandoning the OPTIONAL DROPPABLE BLOCKS.

The above is the packet abandonment compensating method using the conventional Embeded ADPCM and packet format. With the use of this method, the quality is not degraded as described above when information abandonment occurs within a packet, i.e., bit by bit. When the abandonment is done packet by packet, however, the method also abandon the core bits of the Embeded ADPCM, thus degrading the quality. The packet abandonment results in a complete loss of signals for one frame (16 ms), and disables reproduction of the original speech. This state does not end in one frame but may continue to another frame because the encoder and decoder function asynchronously. One of the compensation methods for packet-by-packet abandonment is to reproduce the lost bits through interpolation with the packets before and after the abandoned packet. Since the prediction difference signal or the output of the ADPCM is a signal with the correlation removed, even the interpolation using a sample separated by one frame (128 samples) hardly provides any interpolation effect, resulting in inevitable degradation of the quality.

The conventional coding system using the Embeded ADPCM also abandons the core bits of the Embeded ADPCM when packet-by-packet abandonment has occurred, thus disabling the reproduction of the original speech signal and significantly degrading the quality due to the asynchronous functions of the encoder and decoder.

Further, no positive consideration has been given to the chronological change in bit rate, nor sufficient consideration has been given to how to control the bit rate and how to build a cell with a fixed length. Since the amount of information of a speech signal is changed with time, the Embeded ADPCM which functions with a fixed bit rate varies the quality of the coded speech to produce a discomfortable noise and drops the coding efficiency.

SUMMARY OF THE INVENTION

It is therefore an object of the present invention to provide a variable bit rate coding system which has less degradation of the quality with respect to packet-by-packet abandonment to thereby ensure a stable quality and has high coding efficiency.

A variable bit rate coding system according to the present invention comprises, on a sender side, means for dividing a sequence of signals, such as speech signals, into signals of a plurality of band areas; means for encoding the divided signals for respective band areas by the dividing means for calculating power of the signals of each band area; means for changing a total sum of a number of bits for encoding the signals for each band area and a number of coding bits for each band area based on the power for each frame with a constant length or a variable length, and means for building the signals for each band area encoded by the encoding means and the number of bits for encoding the signals for the each band area into an information unit with a constant length, called a cell, or an information unit with a variable length, called a packet; and comprises, on a receiver side, means for decomposing the cell or the packet; means for identifying an abandoned cell or packet; means for decoding the signals for each band area; means for synthesizing the decoded signals for each band area into a signal of a full band area; and means for reproducing the abandoned cell or packet to fill up a gap caused by the abandoned cell or packet.

According to the present invention, the dividing means divides an input signal into signals of a plurality of frequency band areas, and the encoding means quantizes and encodes the signals of each band area. At this time, the bit number changing means performs allocation of the coding bits for each band frame by frame based on the power of each band area signal acquired by the power calculating means. These means eliminates the correlation or redundancy of the input signal, thus ensuring highly-efficient encoding of the input signal. At the same time, the SNR of the decoded signal on the receiver side is predicted by the means for changing the total number of encoding bits for each band area based on the power of each band area signal, and the bit rate is controlled by this means in such a way as to make the SNR constant. It is therefore possible to maintain the quality of the decoded signal constant. In addition, the bit rate is changed in accordance with a chronological change in property of the input signal, further enhancing the coding efficiency.

Then, the encoded signals for each band area and the signals representing the number of coding bits for the signals for each band area are subjected to a multiplexing process (building a cell or packetization), and the resultant signals are sent on a transmission path. At this time, each cell or packet may be or may not be given priority. Unlike the conventional ADPCM which makes prediction using old signals and performs synchronous adaptive control of quantizers by the encoder and decoder, the present invention independently encodes signals of a plurality of frequency band areas frame by frame. Whichever cell or packet is abandoned, therefore, the abandonment does not affect the next cell or packet. This can significantly reduce the degradation of the quality due to the cell abandonment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
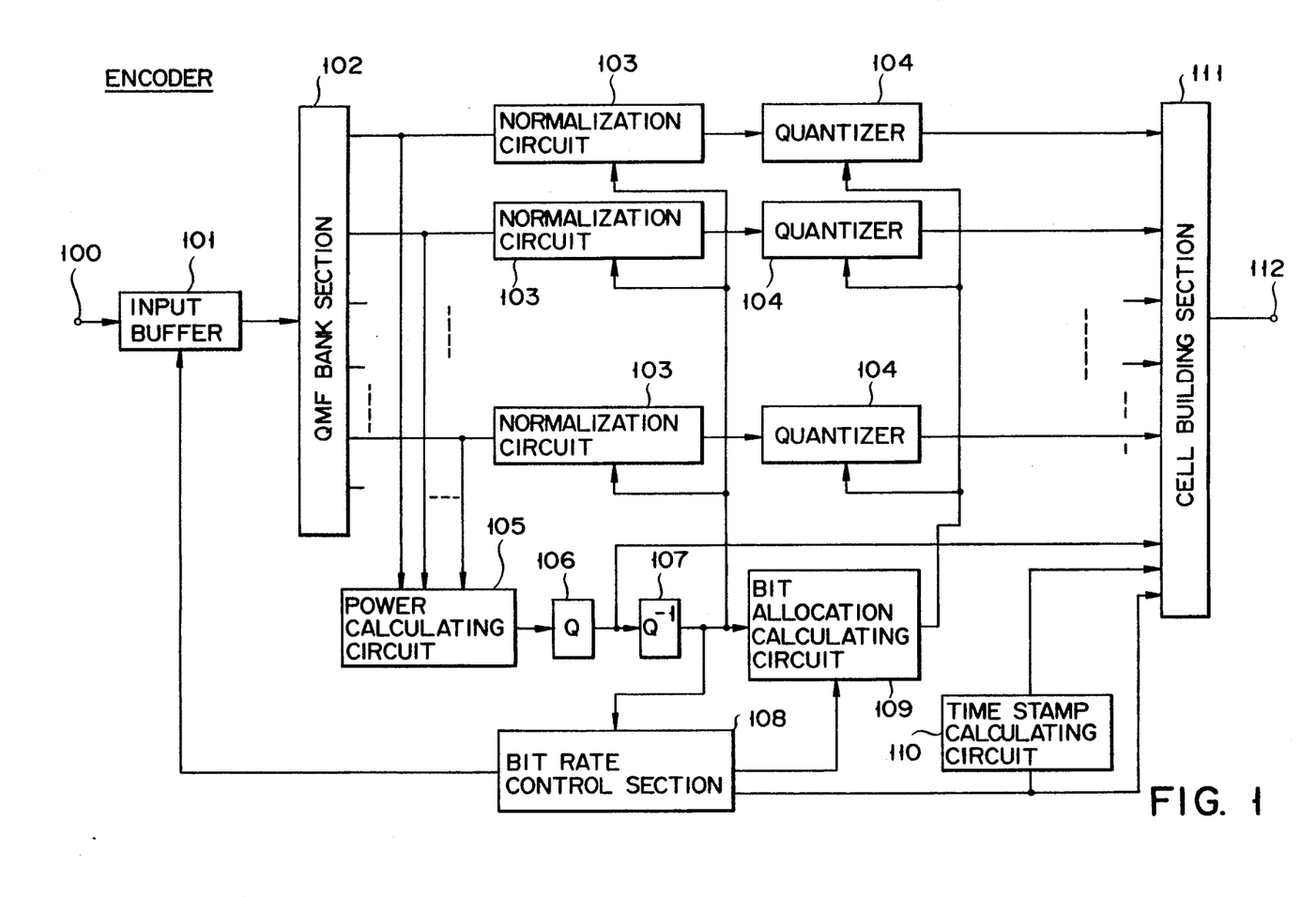
FIG. 1 is a block diagram illustrating the structure of an encoder section of a variable bit rate coding apparatus according to one embodiment of the present invention.

Referring to FIG. 1, a sequence of digital signals is input to an input terminal 100, and predetermined samples of the sequence of signals are stored in an input buffer 101. A filter bank 102 divides the sequence of input signals into a plurality of frequency band areas. As an excellent filter bank that does not cause the aliasing distortion of the spectrum, a QMF (Quadrature Mirror Filter) bank is known, which is used in the present embodiment to separate a signal band area up to 4 kHz into 8 equal band areas.

Figure 2:
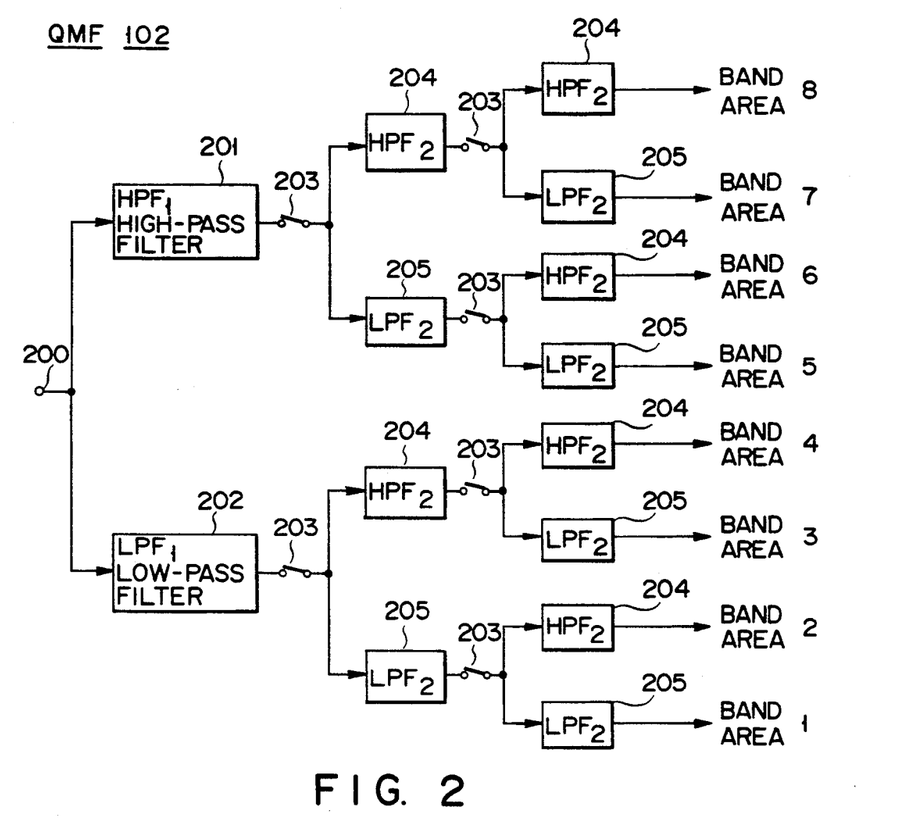
FIG. 2 is a block diagram exemplifying the structure of a QMF bank in FIG. 1.

Referring to FIG. 2 that presents a block diagram exemplifying the structure of the QMF bank, a high-pass filter 201 and a low-pass filter 202 are provided in the QMF bank. These filters 201 and 202 are each constituted of a 32nd FIR filter. Another high-pass filter 204 and low-pass filter 205 likewise are each constituted of a 16th FIR filter. Changing the order of the first-stage filter, the second-stage filter and the third-stage filter from one another can produce such an effect as to reduce the amount of delays originating from filtering computation without deteriorating th filter characteristic by the utilization of the fact that the inclination of the spectrum of a speech signal differs between the low and high bands. The coefficients of the filters are designed to avoid the aliasing distortion of the spectrum. (As the details of the filter design are depicted in N. S. Jayant P. No. 11: "Digieat Coding of Waveforms," PRENTICE-HALL, INC. (Document 3), the detailed description will be omitted here.)

Referring again to FIG. 1, a normalization circuit 103 serves to normalize the signal of each band area or the output of the QMF bank 102 as a preprocess of the quantization. A simple, practical example of the normalization circuit is a circuit that divides the signal of each band area by an RMS (Root Mean Square) for each band area. A quantizer 104 serves to quantize the normalized signal of each band area by a predetermined bit number, and is constituted of a table lookup. A band power calculating circuit 105 is provided to compute the power of the signal of each band area. Given that the sequence of signals of the i-th band area is $X_i(n)$ where $i = 1, 2, \ldots, 8$, the circuit 105 computes an RMS value $\sigma_i$ using the following equation (1), then outputs the result.

$$\sigma_i = \sqrt{\frac{1}{N} \sum_{n=1}^{N} X_i^2(n)} \tag{1}$$

where N is the interval over which the RMS is computed.

A quantizer 106 quantizes the RMS value $\sigma_i$ of each band area from the power calculating circuit 105 with a predetermined bit number, and outputs the resultant code to a cell building section 111 and an inverse quantizer 107. The inverse quantizer 107 outputs a value $\tilde{\sigma}_i$ which is the code of $\tilde{\sigma}_i$ inversely quantized. The normalization circuit 103, a bit rate control section 108 and a bit allocation calculating circuit 109 use $\tilde{\sigma}_i$, acquired by the decoder, as an RMS value of each band area. This can completely prevent characteristic degradation due to miss match between the quantizing bit numbers or normalizing parameters between the encoder and decoder sides.

The bit rate control section 108 controls the bit rate so that the quality of the signal to be decoded by the decoder based on the power of the signal of band area are stable and the amount of codes from the encoder becomes constant. (The detailed description of this bit rate control section will be given later.)

The bit allocation calculating circuit 109 calculates the quantity of bits to be allocated to the quantizers of the individual band areas, based on the power of the signals of the individual band areas and the bit rate from the bit rate control section 108. The details of the circuit 109 will also be discussed later.

A time stamp calculating circuit 110 computes the head subframe number of a frame to be transferred in a cell. More specifically, the calculating circuit 110 calculates the number of subframes to be transferred in one cell. Given that the time stamp for the i-th frame (cell)

is $T_s(i)$, the time stamp for the $(i-1)$-th frame (cell) is $T_s(i-1)$ and the subframe number is $N_s(i-1)$, then $T_s(i)$ can be computed from the following equation.

$$T_s(i) = T_s(i-1) + N_s(i-1) \qquad (2)$$

Figure 3:
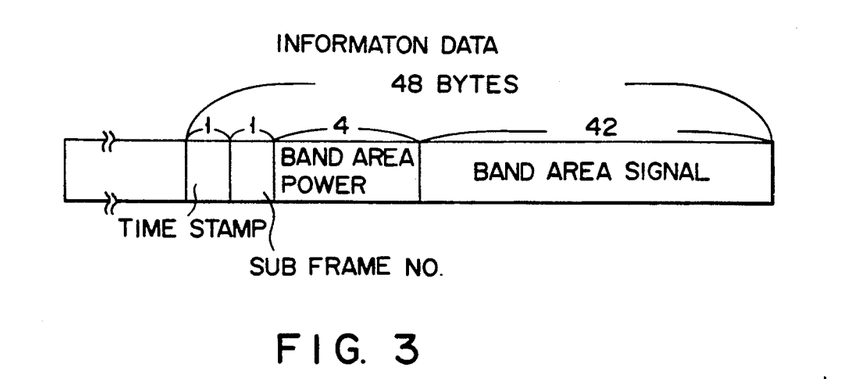
FIG. 3 is a diagram showing the format of an information section of a cell.

The cell building section 111 builds a cell for the sequence of codes of each band area signal, the RMS value of each band area signal, the subframe number in one cell and the time stamp in the format shown in FIG. 3.

In the format in FIG. 3, the entire cell length is 52 bytes of which 48 bytes are occupied by an information section that consists of 1-byte time stamp, 1-byte subframe number, 4-byte band area power, and 42-byte band area signal.

Figure 4:
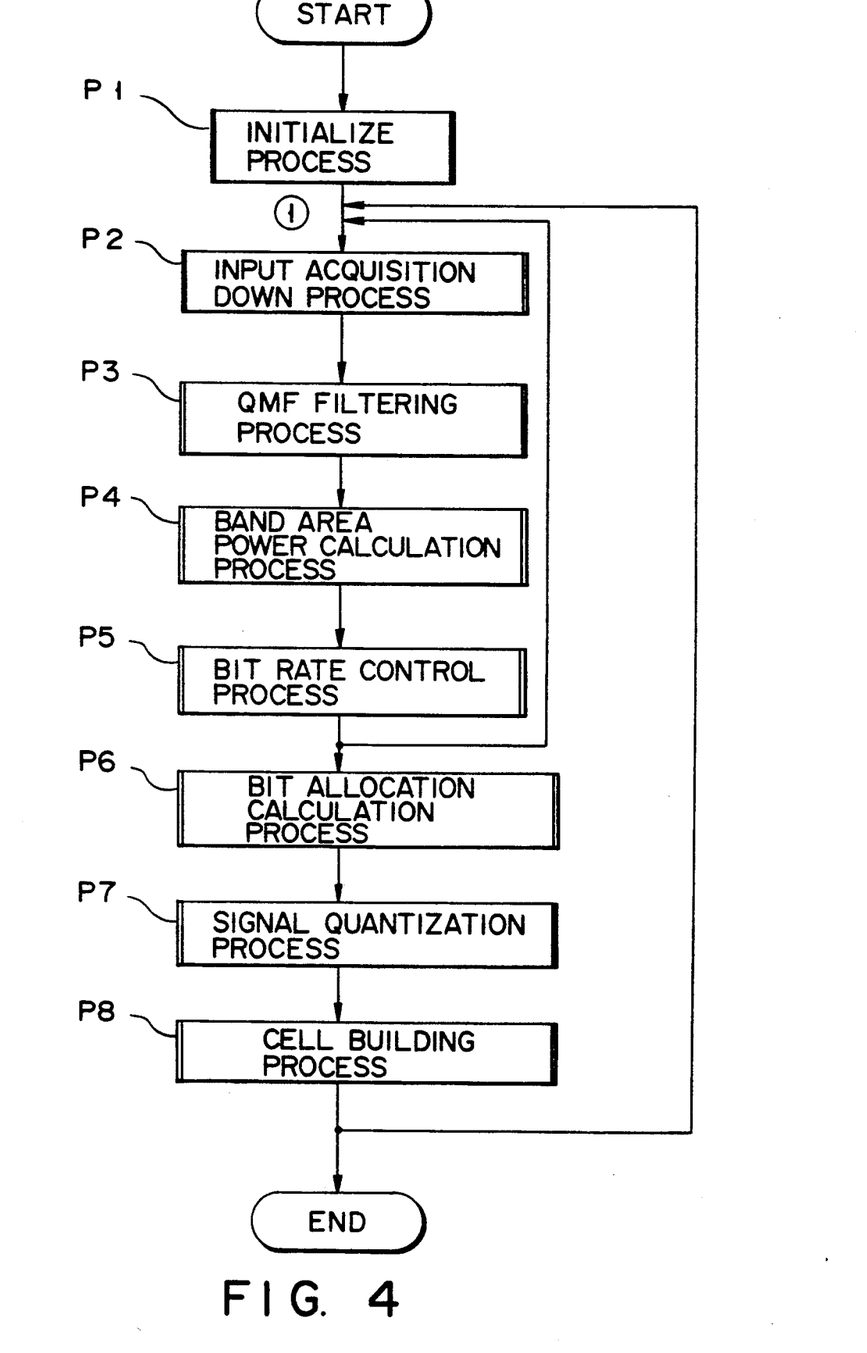
FIG. 4 is a schematic flowchart for explaining the general operation of an encoder.

FIG. 4 is a schematic flowchart illustrating the general operation of the encoder.

First, as the initialization process (P1), the input buffer, QMF bank and the time stamp are cleared, and initial values are set for the target SNR, maximum subframe number and subframe length.

Then, process routines of an input acquisition process (P2), QMF filter process (P3), band area power calculation process (P4) and bit rate control process (P5) are repeated subframe by subframe until the target SNR is reached.

Subsequently, a process for calculating the bit allocation for each band area (P6) is executed. After execution of a process of quantizing each band area signal based on the bit allocation (P7), a cell building process (P8) is performed.

The above sequence of processes is repeatedly executed for each frame (cell).

Figure 5:
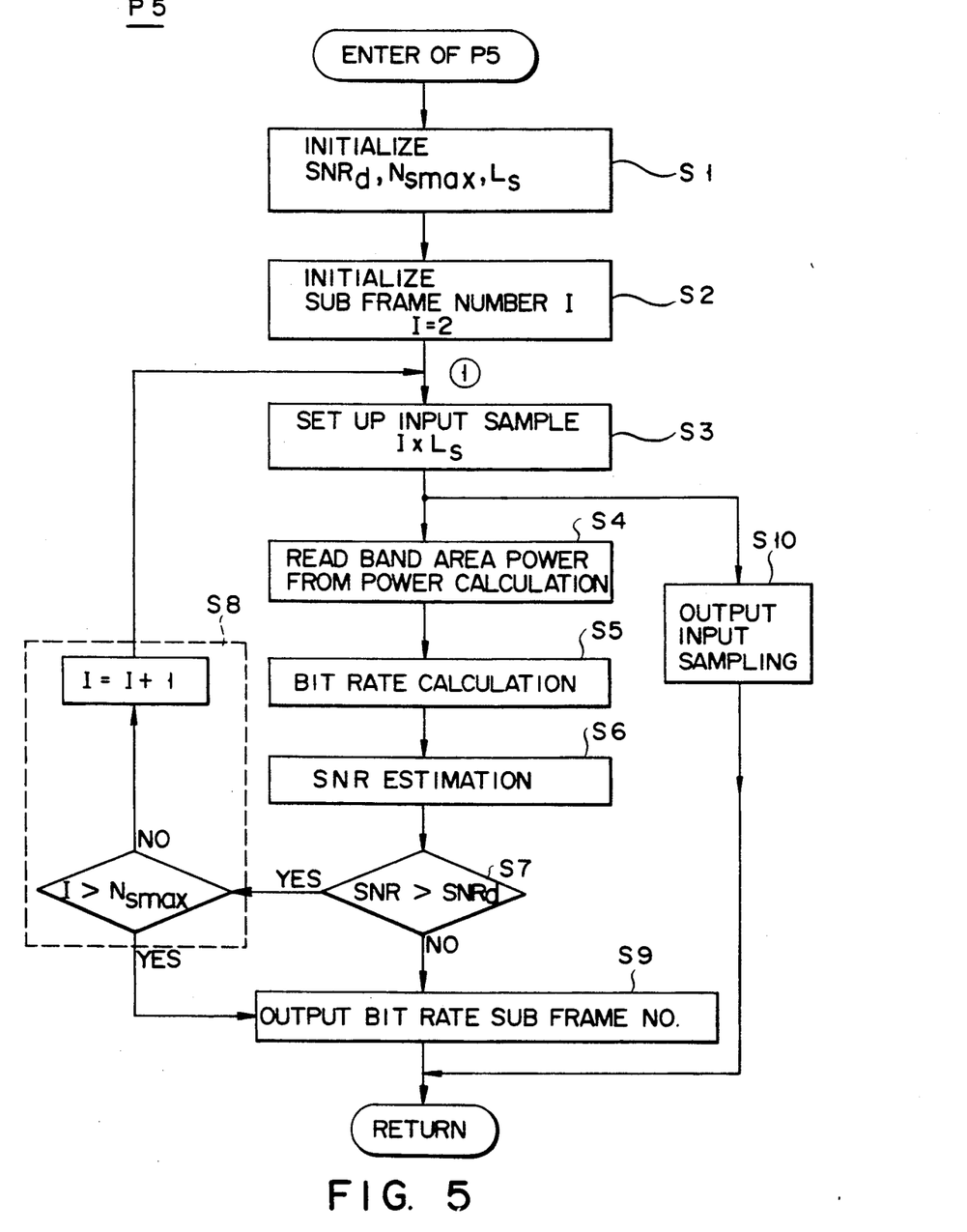
FIG. 5 is a detailed flowchart illustrating the operation of a bit rate control section in FIG. 1.

More specifically, the bit rate control process (P5) is performed according to the detailed flowchart given in FIG. 5, which includes the following steps executed by the bit rate control section.

First, as the initialization step (S1), the target $SNR_d$, the maximum subframe number $N_{smax}$ per cell and the subframe length $L_s$ are set. Then, $I=2$ is set as the initial value for the subframe number I (S2). Next, the number of input samples to the QMF is set to $I \times L_s$, which is then sent to the input buffer (S3). Subsequently, the RAMS value $\bar{\sigma}_i$ of each band area acquired by the power calculating circuit is read out (S4), and the average bit rate R per sample necessary to transfer the sequence of signals of the to-be-coded $I \times L_s$ samples in one cell is computed by the following equation (3) (S5).

$$R = \frac{B}{I \times L_s} \qquad (3)$$

where B is the total bit number assigned to transfer codes of the band area signal, and is $B = 42 \times 8 = 336$ in the format shown in FIG. 3.

SNR of the signal to be decoded by the decoder is predicted from the following equation using the RMS value $\bar{\sigma}_i$ of each band area and the average bit rate R (S6).

$$SNR = 10 \cdot \log_{10} \left[ \frac{\sum_{k=1}^{M_b} \bar{\sigma}_K^2}{M_b \cdot \epsilon^2 \cdot 2^{-2R} \cdot \left( \prod_{k=1}^{M_b} \bar{\sigma}_K^2 \right)^{1/M_b}} \right] \qquad (4)$$

where $M_b$ is the number of divided sections of a band area: $M_b = 8$ in this embodiment.

The above SNR predicting equation is based on the result of theoretically analyzing the root mean square of the encoding error in the case of the optimal bit allocation given in the sub-band coding system. Table 1 is a list of the values predicted through the equation (4) in comparison with the values of SNR acquired through computer simulation. This table shows that the predicted values are very close to the SNR values acquired through the actual signal coding. In Table 1 the bit rate is set to 16 Kbps.

TABLE 1

| Frame Number | Predicted SNR | SNR Through Simulation |
|---|---|---|
| 1 | 23.4 | 23.9 |
| 2 | 10.9 | 9.9 |
| 3 | 12.3 | 12.6 |
| 4 | 21.0 | 21.8 |
| 5 | 29.4 | 28.7 |
| 6 | 25.9 | 26.1 |
| 7 | 17.6 | 16.2 |
| 8 | 26.3 | 25.4 |
| 9 | 23.5 | 24.4 |

Bit rate is 16 Kbps

After the prediction of SNR, SNR is compared with the target $SNR_d$ (S7). If SNR is greater than $SNR_d$, the subframe number is incremented by one after checking that the subframe number I is equal to or below the maximum subframe number $N_{smax}$, then the flow returns to (1) of the flowchart (S8). The above-described sequence of processes is repeated until SNR becomes equal to or below $SNR_d$, and the bit rate per sample and subframe number (I − 1) immediately prior to the condition $SNR > SNR_d$ is satisfied are output (S9). If the subframe number exceeds $N_{smax}$, the bit rate per sample and the subframe number $I = N_{smax}$ are output (S10).

The above bit rate control method, which changes the bit rates by increasing the number of input samples to be coded while predicting SNR, has the following three main advantages.

(1) Constant quality can always be kept.
(2) Coded data can correctly put in a cell with a fixed length.
(3) The coding efficiency is high because the bit rate is changed according to the chronological change in property of the input signal.

Figure 6:
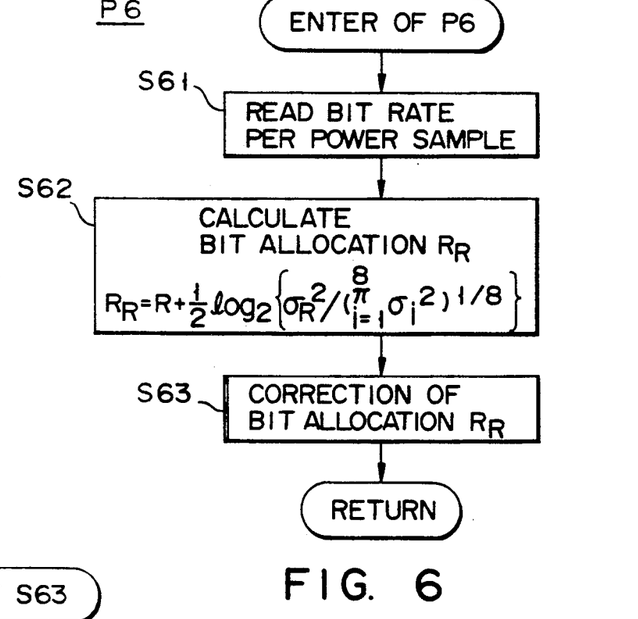
FIG. 6 is a detailed flowchart illustrating the operation of a bit allocation calculating circuit in FIG. 1.

The flowchart shown in FIG. 6 which is executed by the aforementioned bit allocation calculating circuit 109 will be depicted below.

First, the RMS value $\bar{\sigma}_i$ as the power of each band area and the bit rate R per sample are fetched from the inverse quantizer 107 and bit rate control section 108 (S61). Next, the amount of the bit allocation, $R_k$, for each band area is computed from the following equation (5) (S62).

$$R_K = R + \tfrac{1}{2}\log_2 \left[ \frac{\sigma_K^2}{\left(\prod_{i=1}^{M_b} \tilde{\sigma}_i^2\right)^{1/M_b}} \right] \quad (5)$$

$$K = 1, 2, \ldots, M_b$$
$$M_b = 8$$

This equation is to acquire the optimal bit allocation to minimize the root mean square of the decoded error, and is disclosed in N. S. Jayant and P. No. 11: "Digital Coding of Waveforms," PRENTICE-HALL, N.J. (Document 4).

The amount of bit allocation $R_k$ computed through the equation (5) is a real number. In a case where a scalar quantizer is used to quantize the signal of each band area, however, $R_k$ should be an integer number so that it would be compensated accordingly (S63).

Figure 7:
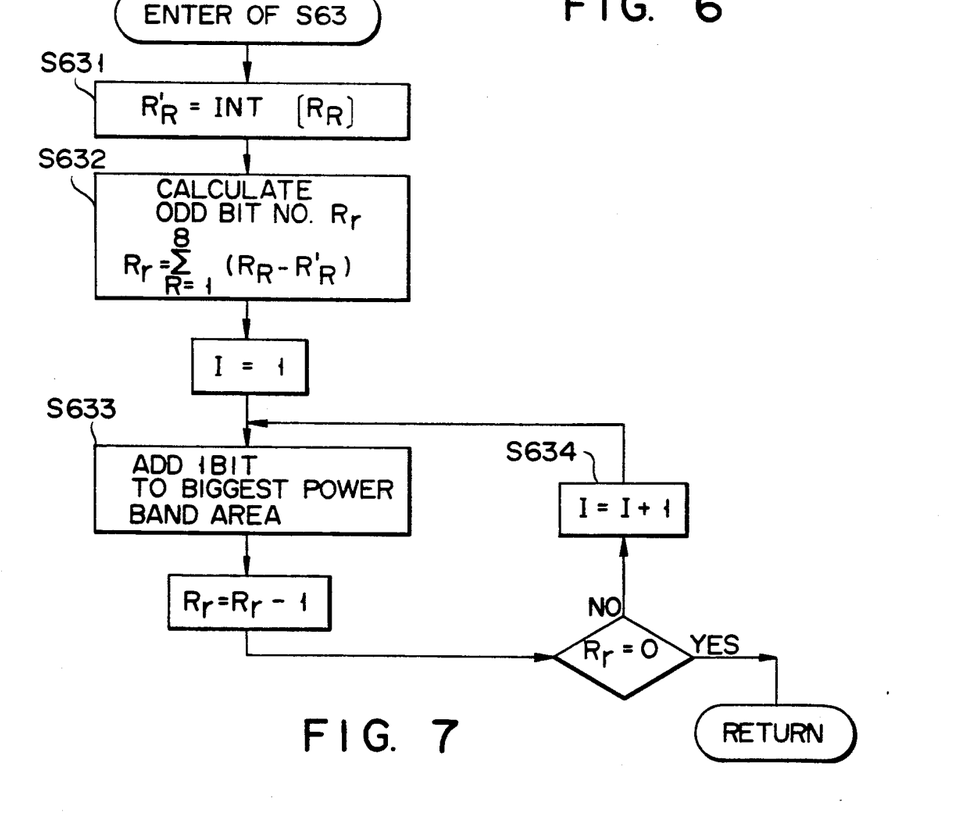
FIG. 7 is a detailed flowchart for explaining how to compensate for bit allocation.

FIG. 7 is a flowchart illustrating one embodiment of the $R_k$ compensating method.

After $R_k$ is rounded off below the decimal point to be an integer number (S631), the number of remaining bits, $R_r$, resulting from acquisition of the integer number is calculated through the following equation (6) (S632).

$$R_r = \sum_{k=1}^{M_b} (R_k - R_k') \quad (6)$$

Then, the remaining bits $R_r$ are reallocated bit by bit in the order of band areas having larger power to the one having lower power (S633). The bit reallocation in the order of larger power to lower power can reduce the decoded error.

The above is the description of the encoder section.

The decoder section will now be described.

Figure 8:
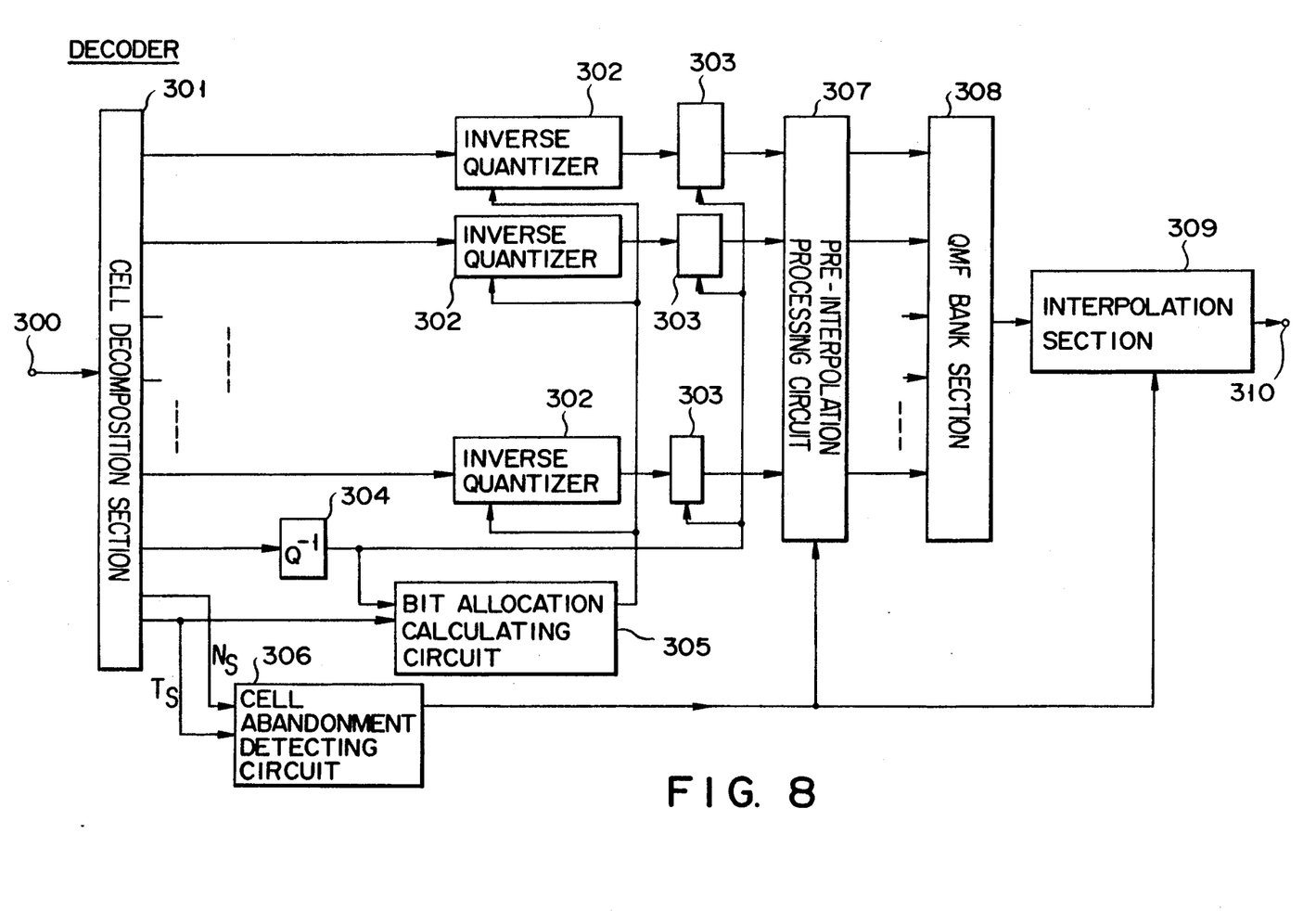
FIG. 8 is a block diagram of a decoder section.

FIG. 8 presents a block diagram of the decoder section of a coding apparatus to which a variable bit rate coding system according to one embodiment of the present invention is applied.

Referring to FIG. 8, a cell decomposition section 301 serves to decompose the cell having the format in FIG. 3 into individual data, such as the time stamp, band area power and band area signal. An inverse quantizer 302, provided to inversely quantize the signal of each band area, can be realized, like the quantizer 104 in FIG. 1, by a table lookup.

An inverse normalization circuit 303 multiplies the output of the inverse quantizer 302 by the RMS value $\tilde{\sigma}_K$ of each band area. A bit allocation calculating circuit 305 like the bit allocation calculating circuit 109 in FIG. 1 calculates the amount of bits allocated to each band area using the RMS value $\tilde{\sigma}_K$ ($K=1, 2, \ldots, M_b$) for each band area and the subframe number $N_s$ per cell. First, an average bit rate R per sample is computed according to the equation (3), and the amount of bit allocation $R_K$ ($K=1, 2, \ldots, M_b$) for each band area is computed according to the equation (5).

A cell abandonment detecting circuit 306 detects if cell abandonment is present or not using the transferred time stamp $T_s$ and subframe number $N_s$.

Figure 9:
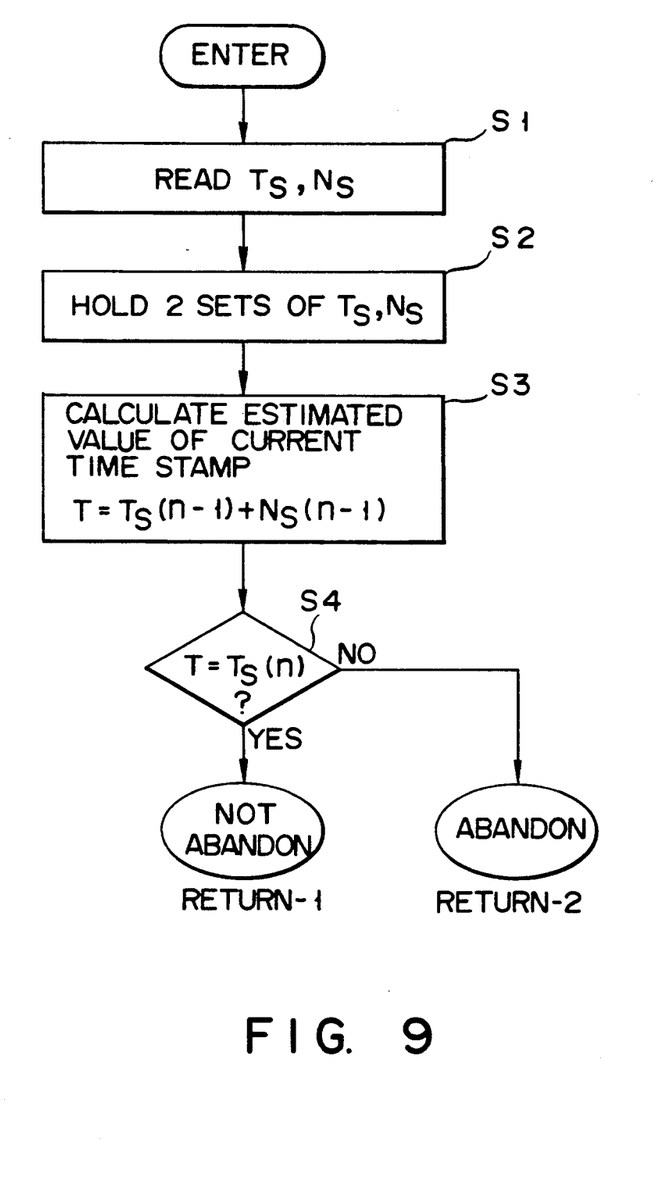
FIG. 9 is a flowchart illustrating the operation of a cell abandonment detecting circuit.

FIG. 9 is a flowchart illustrating how to conduct the detection. This detection method will be explained below referring to FIG. 9 together with FIG. 10.

First, the time stamp and subframe number are fetched (S1), and these $T_s$ and $N_s$ for two cells are always kept (S2).

Next, an expected value T of the present (time n) time stamp is calculated as follows, using the time stamp $T_s(n-1)$ and subframe number $N_s(n-1)$ of the cell one hour older than the presently-arrived cell (S3).

$$T = T_s(n-1) + N_s(n-1)$$

Figure 10:
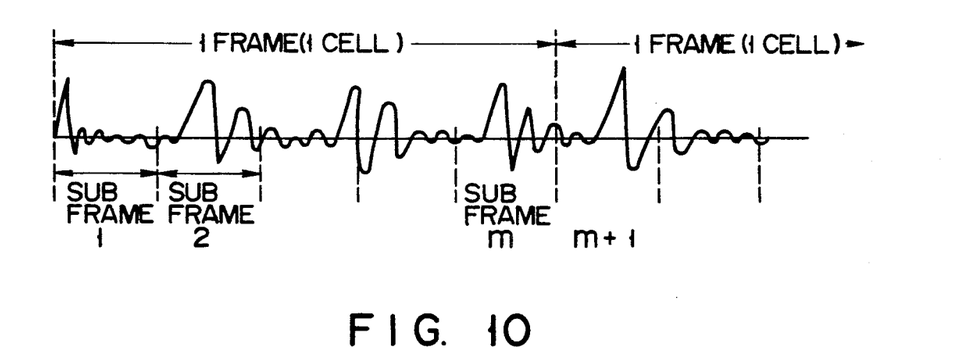
FIG. 10 is a diagram for explaining how to detect cell abandonment.

Then, T is compared with the time stamp $T_s(n)$ (S4), and the cell will be abandoned if they match each other. If they do not coincide with each other, it is judged that the cell abandonment has occurred immediately previous to the present cell. For instance, in the case of FIG. 10, since the following equations (7) are satisfied, it is judged that "no abandonment" has occurred.

$$\left. \begin{array}{l} T_s(n-1) = l \\ N_s(n-1) = m \\ T = T_s(n-1) + N_s(n-1) = m + l \\ \phantom{T} = T_s(n) \end{array} \right\} \quad (7)$$

Referring again to FIG. 8, a pre-interpolation processing circuit 307 permits each band area signal to bypass to a QMF bank section 308 if no abandonment has occurred, and inputs "0" instead of each band area signal to the QMF bank section 308 if cell abandonment has occurred. This QMF bank section 308, which receives the signal of a divided band area and outputs a signal of a full band, has the structure shown in FIG. 2 but with the input and outputs reversed. A decoded or reconstructed signal from the QMF bank section 308 is sent to an interpolation section 309 at the next stag which performs an interpolation of the signal loss originating from the cell abandonment.

Figure 11:
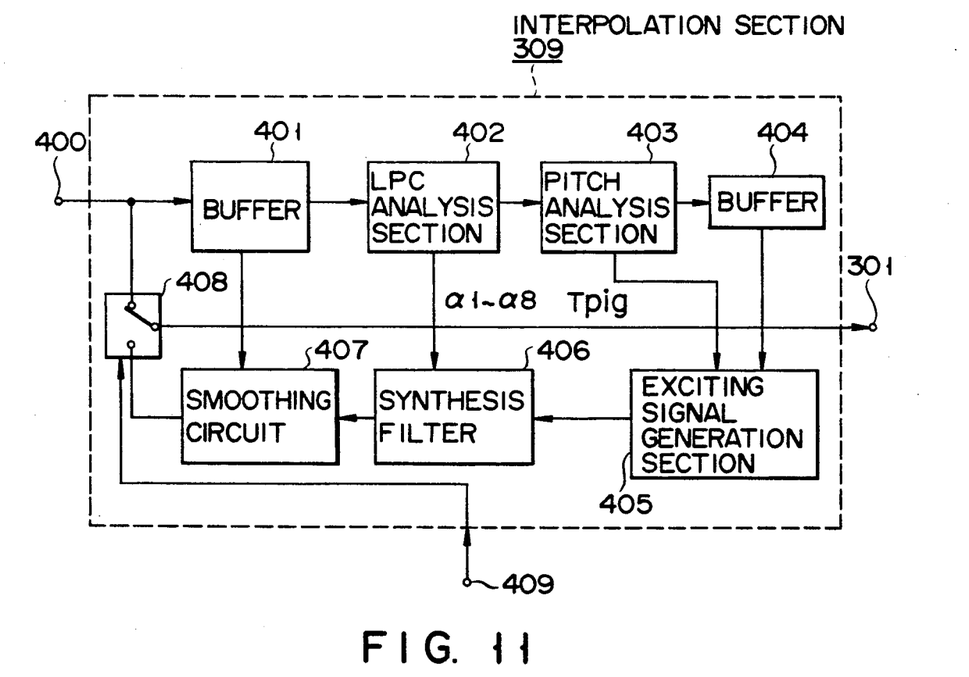
FIG. 11 is block diagram exemplifying the structure of an interpolation section shown in FIG. 8.

FIG. 11 is a block diagram illustrating one embodiment of the interpolation section, and FIGS. 12A through 12E exemplify signal waveforms illustrating the progression of the interpolation.

Referring to FIG. 11, the reconstructed signal coming from an input terminal 400 is bypassed to an output terminal 301 in the case of no cell abandonment according to a cell abandonment signal supplied from a terminal 409. In the case of cell abandonment, the interpolation would be executed as follows.

First, the reconstructed signal of a cell immediately before the abandonment is fetched from a buffer 401 and is sent to an LPC analysis section 402. This section 402 executes an LPC analysis using the "auto-correlation method" or "covariance method" to acquire prediction coefficients $a_1, a_2, \ldots, a_p$ (P is a prediction order number and is set to 8 here) and a prediction residual signal e(n). Since this LPC analysis is described in detail in "Digital Signal Processing of Speech," written by R. W. Shafer and translated by Suzuki, Corona Co., Ltd. (Document 5), its description will be omitted.

A transfer function H(z) of the prediction filter is expressed by the following equation (8).

$$H(z) = 1 - \sum_{i=1}^{p} a_i z^{-i} \quad (8)$$

Then, the prediction residual signal e(n) is subjected to pitch analysis in a pitch analysis section 403 to acquire a gain g and a prediction residual signal $e_p(n)$. Although the pitch analysis is also discussed in the document 5, $T_p$ and g are acquired in this example as follows.

With the last sampling point of a frame in the reconstructed signal of the cell (frame) immediately before the abandonment being set to n=N, an error function $E(T_p)$ in the following equation (9) is defined.

$$E(Tp) = \sum_{n=N-L}^{N} |x(n) - x(n - Tp)|_{20 \leq Tp \leq 140} \quad (9)$$

where L is the interval for evaluation of an error and is set here to L=70.

As the pitch period $T_p$, the one that minimizes $E(T_p)$ above is acquired. The pitch gain g is computed from the following equation (10) after the acquisition of $T_p$.

$$g = \frac{\sum_{n=N-Tp}^{N} x(n)x(n - Tp)}{\sum_{n=N-Tp}^{N} \{x(n - Tp)\}^2} \quad (10)$$

The prediction residual signals e(n) and $e_p(n)$ are calculated from the following equations (11) and (12), and $e_p(n)$ is accumulated in a buffer 404.

$$e(n) = x(n) - \sum_{i=1}^{p} a_i x(n - i) \quad (11)$$

$$e_p(n) = e(n) - g \cdot e(n - T_p) \quad (12)$$

where x(n) is a signal from the buffer 401.

Figure 12A:
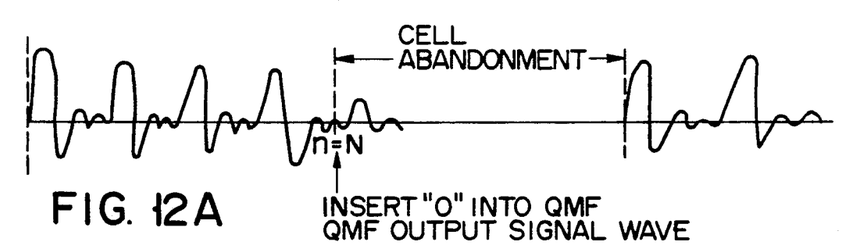
FIGS. 12A through 12E show examples of waveforms for explaining the interpolation.
Figure 12B:
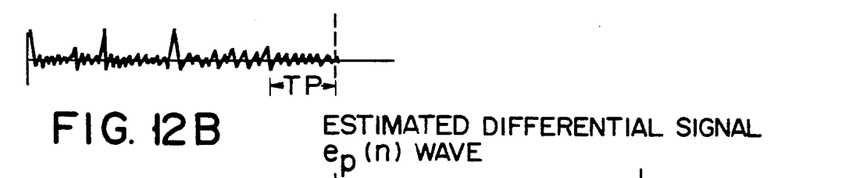
Figure 12C:
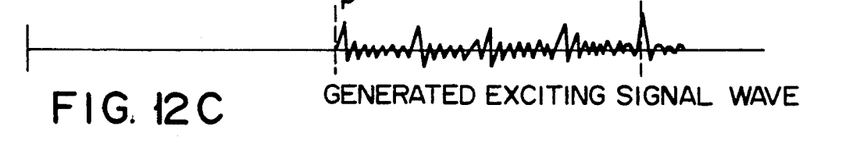
Figure 12D:
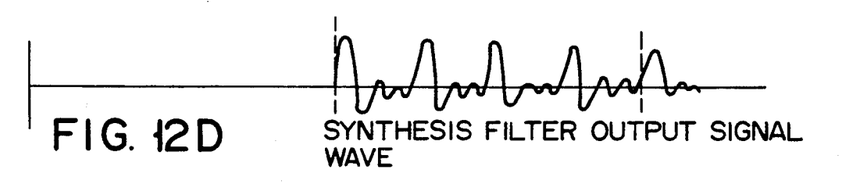
Figure 12E:
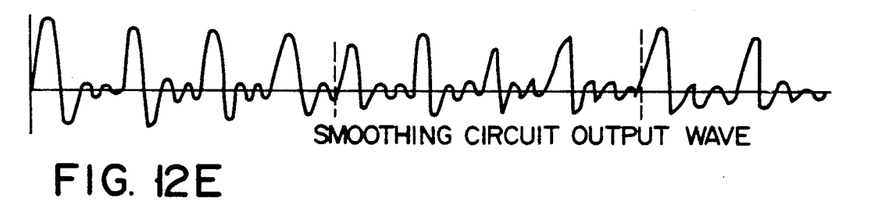

The prediction residual signals $e_p(n)$ for $T_p$ samples from the last one are read out from the buffer 404 in an exciting signal generation section 405, and the residual signals multiplied by the pitch gain g are repeatedly linked together, thus yielding the exciting signal shown in FIG. 12C.

Then, this exciting signal is input to a synthesis filter 406 which is an inverse type of the prediction filter used in the aforementioned equation (8), and signals of the abandoned cell are synthesized. The synthesized signal is sent to a smoothing circuit 407 where it is subjected to a smoothing process with the reconstructed signal of a cell previous to the abandoned cell or reconstructed signals of those cells before and after the abandoned cell. The smoothing process is executed according to the following equation (13) where x(n) is the reconstructed signal of the previous cell, $\bar{x}(n)$ is the synthesized signal, and y(n) is the smoothed output.

$$y(n) = \{1 - W(n)\} + W(n)\bar{x}(n) \quad (13)$$

Figure 13:
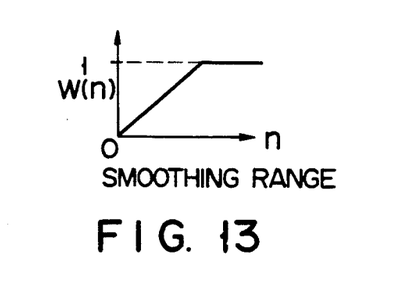
FIG. 13 is a diagram illustrating a smoothing window function.

W(n) in this equation is a smoothing window function and is represented by the one (function graph) shown in FIG. 13.

The interpolation in the above embodiment may be replaced with an interpolation of the level of the exciting signal. The latter method produces such an effect that even when a non-continuous point at the level of the exciting signal exists between the cells before and after the abandoned cell, putting the signal through the synthesis filter can smooth the non-continuous point, thus yielding a waveform on which the non-continuous point is hardly noticeable in the level of speech. This method further produces an effect such that the degradation of the reconstructed signal due to the cell abandonment is hardly noticeable because the continuity between the cells before and after the abandoned cell is enhanced by the smoothing circuit.

A computer simulation was conducted under the conditions that the number of band areas is 8, the subframe length is 24 samples, the maximum subframe number is 12 and the target SNR is 22 dB in the above embodiment. The results showed excellent properties: the average bit rate was 21 Kbps, a higher quality than 32 Kbps ADPCM, and the degradation of the reconstructed signal acquired when the cell abandonment ratio is 5% was hardly noticed.

According to the present invention, the quality of the reconstructed signal can be kept constant since the coding bit rate is controlled frame by frame, and a higher coding efficiency can be obtained because of a change in coding rate in accordance with the entropy (amount of information) of the input signal In addition, since the coding bits of individual frequency band areas are allocated on the basis of the power of the signals of the respective band areas, SNR of the reconstructed signal is improved, yielding a high-quality reconstructed signal. Since the total sum of the coded data is controlled to be within a cell with a fixed length, reduction in efficient due to excessively insufficient coded data would not occur.

Further, according to the present invention, because of independent coding of signals of a plurality of frequency band areas frame by frame, the degradation due to the cell abandonment does not continue and can thus be kept only in the abandoned cell unlike in the case of the ADPCM or Embeded ADPCM which controls the prediction and quantization using old signals. Regardless of which cell has been abandoned, the influence of the abandonment is small, making it unnecessary to perform the priority control of cells. This can simplify the structure of the system. Furthermore, the interpolation can allow reproduction of the abandoned cell without slight noticeable degradation of the quality.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A variable bit rate coding apparatus having an encoder for encoding a signal and a decoder for decoding said encoded signal, said encoder comprising:

input buffer means for receiving a sequence of digital signals to accumulate a sequence of a predetermined number of samples;

filer tank means for dividing said input sequence of signals into a plurality of frequency band areas and outputting a plurality of band area signals;

encoder processing means for processing said band area signals to determine the power of each band area signal and to produce a predetermined sequence of codes for each band area and a code of an RMS value of each band area signal;

bit rate control means for controlling a bit rate based on said power of each band area signal in such a manner that a signal to noise ratio (SNR) of a signal to be decoded by said decoder is constant and an amount of codes form said encoder can be kept constant;

time stamp calculating means for calculating the number of subframes at a beginning of a frame, said frame consisting of a plurality of subframes and transferred in units of one cell which contains the subframes of a respective frame, said time calculating means calculating a time stamp $T_s(i)$ of the i-th frame from a following equation (2) at a time of calculating the number of subframes to be transferred per frame which is output from said bit rate control means:

$$T_s(i) = T_s(i-1) + N_s(i-1) \quad (2)$$

where $T_s(i-1)$ is a time stamp of $(i-1)$-th frame and $N_s(i-1)$ is the number of subframes; and cell building means for building a cell of a sequence of codes of each band area signal, a code of said RMS value of each band area signal, a number of subframes per cell and a time stamp in a predetermined format;

said decoder comprising:

cell decomposition means for decomposing a cell unit encoded by said encoder into signals for each band area and a time stamp and for processing said decomposed band area signals for subsequent recombining of said band area signals;

cell abandonment detecting means for detecting a cell abandonment based on a time stamp and subframe number determined from each decomposed cell unit; and interpolation means for interpolating band area signals when a cell abandonment is detected by said cell abandonment detecting means and for outputting a reconstructed signal based on band area signals processed by said cell decomposition means when no cell abandonment is detected and based on interpolated band area signals when a cell abandonment is detected.

2. The variable bit rate coding apparatus of claim 1, wherein said encoder processing means comprises:

normalizing means for normalizing a signal for each band area from said filter bank means by dividing the signal for each band area with a root mean square;

first quantization means for quantizing said normalized signal for each band area with a predetermined bit number;

band area power calculating means for calculating power of a signal of each band area;

second quantization means for quantizing an RMS (Root Mean Square) of each band area from said band area power calculating means with a predetermined bit number;

first inverse quantization means for inversely quantizing a code of said RMS value and outputting a resultant value; and bit allocation calculating means for calculating an amount of bits to be allocated to said first quantization means for each band area based on said power of each band area signal and said bit rate output from said bit rate control means;

wherein said normalization means, said hit rate control means, and said bit allocation calculating means use the resultant value of each band area output by said second inverse quantization means in order to prevent degradation of a characteristic caused by mismatching or quantizing bit numbers between said encoder and said decoder and of normalizing parameters therebetween.

3. A variable bit rate coding method comprising:

clearing an input buffer, a QMF bank and a time stamp and setting initial values to a maximum subframe number and a subframe length as initialization;

acquiring a sequence of input signals subframe by subframe;

performing QMF filtering of the input signals to produce plural band area signals;

calculating power of each band area signal;

repeating a bit rate control step until a target SNR is reached;

calculating a bit allocation to each band area;

quantizing a signal of each band area based on said bit allocation; and building a cell;

wherein the bit rate control step comprises, an initial setting step of setting a target $SNR_d$, a maximum subframe number $N_{smax}$ and a subframe length $L_s$, an initialization step for a subframe number I, a first step of setting a number of input samples to the QMF bank;

a second step of reading band area power from a band area power calculating section, a third step of calculating an average bit rate per sample, a fourth step of predicting SNR based on the number of input samples set in said first step, the band area power read in said second step and the average bit rate calculated in said third step, a fifth step of comparing said SNR with said $SNR_d$, a step of repeating the first to fifth steps a number of times equal to said maximum subframe number $N_{smax}$, a step of outputting said bit rate and subframe number per sample when SNR equals $SNR_d$, and a step of outputting said number of input sample to an input buffer, and wherein the above individual steps of said bit rate control step are repeated frame by frame, wherein each frame comprises plural respective subframes transferred to a decoder as one cell;

wherein said bit allocation calculating step comprises, reading a bit rate per band area power sample, and calculating a bit allocation $R_R$ of each band area according to the following equation:

$$R_R = R + \tfrac{1}{2}\log_2 \left[ \frac{\sigma_R^2}{\left(\prod_{i=1}^{M_b} \sigma_i^2\right)^{1/M_b}} \right]; \text{ and}$$

wherein R = average bit rate per sample, $\sigma_R$ = RMS value of the R-th band area, and $\sigma_i$ = RMS value of i-th band area, and $M_b$ is the number of band area signals, which is equivalent to a following equation with K = R and $M_b$ = 8

$$R_K = R + \tfrac{1}{2}\log_2 \left[ \frac{\sigma_K^2}{\left(\prod_{i=1}^{8} \sigma_i^2\right)^{\tfrac{1}{8}}} \right]; \text{ and}$$

compensating for said bit allocation $R_R$.

4. A variable bit rate coding method comprising:

clearing an input buffer, a QMF band and a time stamp and setting initial values to a maximum subframe number and a subframe length as initialization;

acquiring a sequence of input signals subframe by subframe;

performing QMF filtering of the input signals to produce plural band area signals;

calculating power of each band area signal;

repeating a bit rate control step until a target SNR is reached;

calculating a bit allocation to each band area;

quantizing a signal of each band area based on said bit allocation; and building a cell;

wherein the bit rate control step comprises, an initial setting step of setting a target $SNR_d$, a maximum subframe number $N_{smax}$ and a subframe length $L_s$, an initialization step for a subframe number I, a first step of setting a number of input samples, a second step of reading band area power from a band area power calculating sections, a third step of calculating an average bit rate per sample, a fourth step of predicting SNR based on the number of input sample set in said first step, the band area power read from said second step, and the average bit rate calculated in said third step, a fifth step of comparing said SNR with said $SNR_d$, a step of repeating the first to fifth steps a number of times equal to said maximum subframe number $N_{smax}$, a step of outputting said bit rate and subframe number per sample when SNR equals $SNR_d$, and a step of outputting said number of input sample to an input buffer; and wherein the above individual steps of said bit rate control step are repeated frame by frame, wherein each frame comprises plural respective subframes transferred to a decoder as a cell;

wherein said bit allocation calculating step comprises the steps of:

reading a bit rate per band area power sample, calculating a bit allocation $R_R$ of each band area, and compensating for said bit allocation $R_R$, and wherein said step of compensating said bit allocation $R_R$ comprises the steps of:

calculating an integer number from $R_{R'} = \text{INT}$, calculating a remaining bit number $R_r$ resulting from acquisition of said integer number, according to an equation (6)' presented below and rounding off said $R_r$ below a decimal point to provide an integer number;

$$R_r = \sum_{R=1}^{8} (R_R - R_{R'}) \tag{6)'}$$

reallocating said remaining bit number $R_r$ bit by bit in an order of a larger-power band area to a small-power band area; and controlling a repetition of said reallocation step by a predetermined number of times.

* * * * *